United States Patent
Allen et al.

(10) Patent No.: US 10,382,620 B1
(45) Date of Patent: Aug. 13, 2019

(54) PROTECTING CONFIDENTIAL CONVERSATIONS ON DEVICES

(71) Applicant: International Business Machines Corporation, Armonk, NY (US)

(72) Inventors: Corville O. Allen, Morrisville, NC (US); Shikhar Kwatra, Durham, NC (US); Andrew R. Freed, Cary, NC (US); Joseph Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/054,619

(22) Filed: Aug. 3, 2018

(51) Int. Cl.
| | |
|---|---|
| H04M 1/66 | (2006.01) |
| H04M 1/68 | (2006.01) |
| H04M 3/16 | (2006.01) |
| H04M 1/725 | (2006.01) |
| G06F 21/60 | (2013.01) |
| G06F 21/62 | (2013.01) |

(52) U.S. Cl.
CPC ...... *H04M 1/72577* (2013.01); *G06F 21/602* (2013.01); *G06F 21/6245* (2013.01); *H04M 2203/6009* (2013.01); *H04M 2203/609* (2013.01)

(58) Field of Classification Search
CPC ......... H04M 1/72552; H04M 1/72522; H04M 1/72547; H04M 1/271; H04M 1/72563; H04M 1/72569; H04M 2250/12; H04M 19/04; H04M 1/02; H04W 12/06; H04W 12/08; H04W 52/0254; H04W 64/003; H04W 12/04; H04W 40/20
USPC ............... 455/456.3, 466, 412.1, 403, 456.1
See application file for complete search history.

(56) References Cited

U.S. PATENT DOCUMENTS

| | | | |
|---|---|---|---|
| 8,913,721 | B1 | 12/2014 | Narayanan et al. |
| 8,984,427 | B2 | 3/2015 | Hayner et al. |
| 9,307,084 | B1 | 4/2016 | Pycko et al. |
| 9,483,461 | B2* | 11/2016 | Fleizach ............... G10L 13/033 |
| 9,485,359 | B2 | 11/2016 | Kumar et al. |
| 9,576,574 | B2* | 2/2017 | van Os ................... G10L 15/22 |
| 9,620,104 | B2* | 4/2017 | Naik ...................... G10L 13/027 |
| 9,711,141 | B2* | 7/2017 | Henton ................... G10L 15/22 |
| 2005/0246771 | A1* | 11/2005 | Hunt ..................... H04L 9/3273 |
| | | | 726/18 |

(Continued)

OTHER PUBLICATIONS

Johnc, "Stop Data Loss with Watermarking and Anti-Screen Capture," https://sierraware.com/blog/?p=141, The Sierraware Blog, Jan. 31, 2016, 4 pgs.

(Continued)

*Primary Examiner* — Joseph Arevalo
(74) *Attorney, Agent, or Firm* — Jared L. Montanaro

(57) ABSTRACT

A first mobile device may receive user-input data for generation of an electronic message. The electronic message may be generated as the user-input data is received. The first mobile device may identify sensitive information, within the electronic message. The first mobile device may secure the sensitive information. The first mobile device may disable a screen capture function of the first mobile device. The first mobile device may send the electronic message to a second mobile device. The sending of the electronic message to the second mobile device may include the sending of the secured sensitive information.

15 Claims, 6 Drawing Sheets

(56) References Cited

U.S. PATENT DOCUMENTS

| | | |
|---|---|---|
| 2010/0010912 A1 | 1/2010 | Jones et al. |
| 2011/0213845 A1* | 9/2011 | Logan ................ G06Q 10/107 |
| | | 709/206 |
| 2012/0075057 A1* | 3/2012 | Fyke ................ G07C 9/00103 |
| | | 340/5.3 |
| 2012/0075059 A1* | 3/2012 | Fyke ................ G06F 21/35 |
| | | 340/5.21 |
| 2012/0102543 A1 | 4/2012 | Kohli |
| 2013/0053139 A1* | 2/2013 | Krebs ................ G07F 17/3216 |
| | | 463/29 |
| 2013/0266127 A1 | 10/2013 | Schachter et al. |
| 2014/0298479 A1 | 10/2014 | Stass et al. |
| 2016/0012465 A1 | 1/2016 | Sharp |
| 2016/0307063 A1 | 10/2016 | Bright et al. |
| 2016/0337386 A1 | 11/2016 | Ford |
| 2016/0344770 A1* | 11/2016 | Verma ................ H04L 63/1483 |
| 2016/0380927 A1 | 12/2016 | Vaughn et al. |
| 2017/0332200 A1 | 11/2017 | Kaiman |
| 2018/0315427 A1* | 11/2018 | Kwon ................ G10L 15/22 |

OTHER PUBLICATIONS

Unknown, "A Screen Capture Protection Rule does not trigger when content classification is configured in the rule," https://kc.mcafee.com/corporate/index?page=content&id=KB85939snspd-1115, last modified Oct. 29, 2015, Technical Articles ID: KB85939, 2 pgs.

Sanchez et al., "Detecting sensitive information from textual documents: an information-theoretic approach," https://pdfs.semanticscholar.org/8ea3/73b294baab137f728b78ba493bc97cc9264f.pdf, 2012, 12 pgs.

IBM, "InfoSphere Guardian Data Redaction v2.5.1", https://www.ibm.com/support/knowledgecenter/en/SS6NQ7_2.5.1/com.ibm.nex.redaction.doc/topics/opredact_product_overview.html, 3 pgs., printed Aug. 1, 2018.

* cited by examiner

PROTECTING CONFIDENTIAL CONVERSATIONS ON DEVICES

BACKGROUND

The present disclosure relates generally to the field of electronic message security, and more specifically to protecting a user's sensitive information found in an electronic message.

Mobile devices come with many features built in, such as various security algorithms, screen capture functions, and text messaging options. Screen capture functions allow users to take a photograph of the screen currently displayed to a user. As society has transitioned to sending and receiving more electronic based communications, sensitive information is transferred between mobile devices at a much higher rate than in times past. With the increase of sharing sensitive information, through electronic communications, each mobile device is vulnerable to possible malfeasance.

SUMMARY

Embodiments of the present disclosure include a method, computer program product, and system for securing user-input data determined to be sensitive information. A first mobile device may receive user-input data for generation of an electronic message. The electronic message may be generated as the user-input data is received. The first mobile device may identify sensitive information, within the electronic message. The first mobile device may secure the sensitive information. The first mobile device may disable a screen capture function of the first mobile device. The first mobile device may send the electronic message to a second mobile device. The sending of the electronic message to the second mobile device may include the sending of the secured sensitive information.

Embodiments of the present disclosure may further include a memory and a processor on the first mobile device. The first mobile device may receive an electronic message from a second mobile device. The electronic message may include sensitive information. The first mobile device may identify a security indicator attached to the electronic message. The security indicator may include one or more rules. The first mobile device may execute the one or more rules, which may include directing the first mobile device to locate a secured database. The first mobile device may store the secured sensitive information in the secured database.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
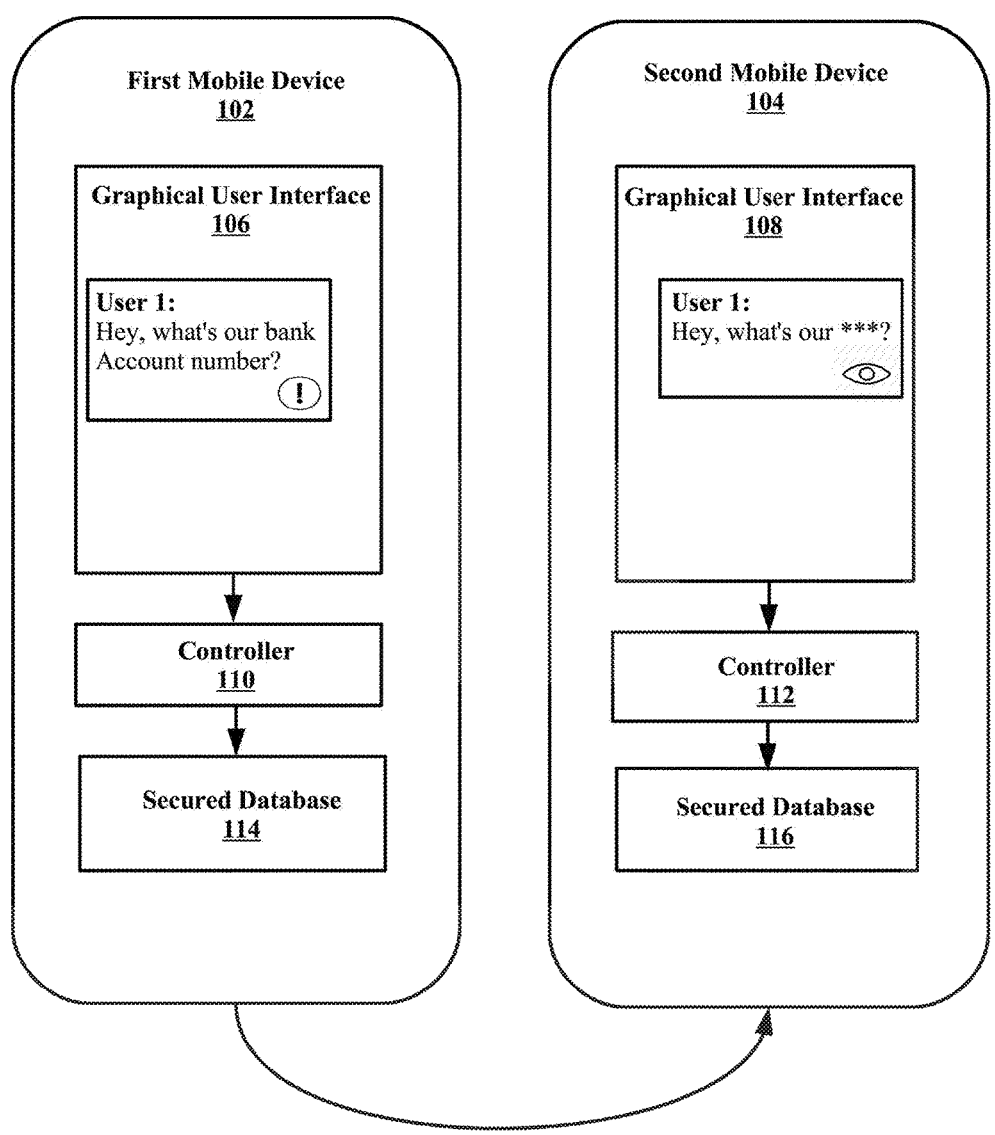
FIG. 1A depicts a block diagram of an example system for masking sensitive information on a first mobile device, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of electronic message security, and more specifically to protecting a user's sensitive information found in an electronic message. While the present disclosure is not necessarily limited to such applications, various aspects of the disclosure may be appreciated through a discussion of various examples using this context.

During the course of communicating through an electronic message (e.g., a text message, an instant message, an anonymous peer-to-peer message, email, etc.) exchange, a first user may desire to share sensitive information (e.g., information that is confidential, user-identifiable, traceable, etc.) with a second user by sending an electronic message with the sensitive information to the second user. The electronic message may be subject to the security protocols, or lack thereof, of the mobile devices involved in the transfer of the sensitive information included in the electronic message. This may lead to malfeasance through interception of the electronic message and consequently the sensitive information by a third party (e.g., through malware installed on the mobile device, an unscrupulous actor utilizing one of the mobile devices' screen capture functions, various applications that perform data mining operations, etc.). As a result, a user may want to take additional precautions to ensure that the sensitive information being shared through an electronic message is adequately secured and protected when it is sent, received, viewed, or displayed on a mobile device (e.g., on a device screen, graphical user interface, etc.).

In some embodiments, one solution is for a user to download an application (e.g., a third-party application from an application store, from an open-source community, etc.) to a mobile device. The application may secure electronic messages by classifying sensitive information within the electronic messages' contents (e.g., the messages sent during chat sessions, instant messaging, texting, etc.) and preventing the sensitive information from being copied (e.g., by a screen grabber, screen capture function, etc.) once opened on another device's screen during or after an electronic message is sent and/or received.

In some embodiments, the application through use of processors and/or other components of the mobile device detects sensitive information (e.g., it is not limited to preprogrammed keywords). In some embodiments, the application can secure the sensitive information on the first mobile device and can disable screen capture functions on the mobile device (e.g., that attempt to: copy, data mine, store the electronic message contents, etc.), while the sensitive information is displayed to a user on a graphical user interface (GUI) of the mobile device.

For the purposes of the present disclosure, a "mobile device" can mean any device used for communicating electronically, including mobile/cellular phones, tablets, laptops, personal computers, personal device assistants, smart devices, and any devices which permit sharing of communications electronically or digitally, including any device that has a GUI. For the purposes of the present disclosure, an "electronic message" can mean a text message, an instant message, an anonymous peer-to-peer message, and other types of messages shared on devices that are to be rendered, by the device, on a screen of the device or GUI. For the purposes of the present disclosure, "sensitive information" can mean any information that is generally considered confidential information, information that is associated with certain industries (e.g., banks, healthcare, etc.), personally identifiable information (e.g., SSNs, birth dates, etc.), and other types of information a user would not want shared indiscriminately. For the purposes of the present disclosure, "user-input data" can mean data that a user inputs into a mobile device. For the purpose of the present disclosure, a "screen capture function" can mean capturing an image of the user's screen by taking a photograph of the user's screen internally through the use of hardware, through the use of device software, through downloaded or original applications of the phone, through default or modified operating system functionality, utilities, or firmware, etc.

In some embodiments, a first mobile device may receive user-input data for generation of an electronic message. The electronic message may be generated as the user-input data is received. The first mobile device may identify sensitive information within the electronic message. The first mobile device may secure the sensitive information. The first mobile device may disable a screen capture function of the first mobile device. The first mobile device may send the electronic message to a second mobile device. The sending of the electronic message to the second mobile device may include sending the secured sensitive information.

For example, a user may compose an email to a colleague on a smartphone. While typing the electronic message, an application installed on (or native to) the smartphone detects, that the user is inputting their mobile banking account number. The application then secures the mobile banking account number from malicious software and/or intrusive applications. The application secures the mobile banking account number by disabling the screen capture function of the smartphone, which includes the hardware shortcut function of pressing three external smartphone buttons simultaneously. After securing the mobile banking account number, the application allows the email that includes the secured mobile banking account number to be sent to the colleague.

As seen above, aspects of the present disclosure provide numerous advantages. For example, aspects of the present disclosure improve security on both sides (e.g., from a first mobile device to a second mobile device and vice versa) of an electronic message communication by first detecting sensitive information on a first mobile device, and by securing the sensitive information on the first mobile device and the second mobile device for safe viewing on both the first and second mobile devices' GUIs.

The aforementioned advantages are example advantages and not all advantages are listed. Furthermore, embodiments of the present disclosure exist that can contain all, some, or none of the aforementioned advantages while remaining within the spirit and scope of the present disclosure.

In some embodiments, the first mobile device may identify sensitive information by analyzing the user-input data entered on the first mobile device using semantic analysis, syntactic analysis, intent-based analysis, and domain-sensitive message content analysis. The first mobile device may associate each of the semantic, syntactic, intent-based, and domain-sensitive message content analyses to respective numerics. The first mobile device may determine, based on the respective numerics, that a sensitive information threshold has been exceeded.

For example, the first mobile device may determine that user-input data is being entered on the first mobile device and perform a semantic sensitivity analysis on the user-input data as it is being entered on the GUI. The semantic sensitivity analysis using statistical clustering and classification methods to extract visual contextual conversation information features then indexes each feature and classifies information into semantic categories, including but not limited to sensitive information. Additionally, K-means clustering may be used to cluster the sensitive information along with using a weighted variation of a Euclidean distance to analyze the phrase comparison. The Euclidean distance compares all components in the feature vector with equal weightings and has low computational complexity.

For example, a user may input, on their mobile device, the statement: "My birthday is: Oct121492, j/k, it's 12/13/85." The mobile device may use semantic analysis to determine, based on the "j/k" that the first piece of information, Oct121492, is sarcasm and give the first piece of information a value of 0, on a 0 to 10 sensitive information scale. However, the mobile device using the same semantic analysis may determine that the second piece of information, 12/13/85, is sensitive information, based on the context clues (e.g., the absence of "j/k", the inclusion of keyword identifiers, etc.) and gives the second piece of information a value of 9, on the 0 to 10 sensitive information scale, with the second piece of information exceeding the threshold determinative of sensitive information (e.g., exceeding a value of 6 on the sensitive information scale).

Following the example above, the mobile device may continue to use syntactic analysis of the user-input data by comparing a regular expression of the user-input data against fields for matching certain predefined patterns that include sensitive information (e.g., Social Security Number, Date of Birth, email accounts, domain specific information, etc.). The mobile device may perform a correlation of the terms typically used in association with the regular expression match and if found designate the content as sensitive. In this way, the mobile device may determine that the second piece of information, 12/13/85 matches a certain pattern that is typical of sensitive information and classify that content as sensitive by giving it a value of 9, on the 0 to 10 sensitive information scale.

In some embodiments, the first mobile device may continue to secure the sensitive information by identifying a location of a secured database on the first mobile device. The secured database may be a preprogrammed (e.g., manufactured into the first mobile device), cryptographically secure area on the first mobile device. The first mobile device may store the sensitive information in the secured database. For example, the sensitive information may be stored in a database carved out during development of the mobile device and that is accessible by explicit commands. In a further example, the storage database may be a one-way storage database that only responds to either read or write commands.

In some embodiments, the first mobile device may mask the sensitive information by replacing one or more elements of the sensitive information, on the first mobile device, with one or more associated characters. The first mobile device may generate an icon that enables viewing of the sensitive information when selected by a user on a GUI on the first mobile device. In some embodiments, the application provides the user an icon just below the sensitive information to enable safe viewing of the sensitive information.

For example, a user may begin generating an electronic message by typing sensitive information. As the user is typing the sensitive information the mobile device is replacing one or more of the elements of the sensitive information with an associated character mark to mask the information on the display screen. When the user sends the message, the mobile device provides an icon under the masked information for the user to be able to access the sensitive information in a safe-viewing mode (e.g., that disables screen-capture features of the mobile device).

In some embodiments, the first mobile device may determine that the user is selecting the icon and pull the sensitive information from the secured database. The first mobile device may display the sensitive information to the user when the user selects the icon. In some embodiments, when the user selects the icon, the sensitive information may be displayed to the user in an un-masked state.

For example, a user may receive a text message on their smartphone that has partially masked information on the display screen: "User Name: *143 ". The user may notice that there is an icon: "", next to the partially masked information: "User Name: *123". The user may touch the icon in order to view the masked information, and responsive to receiving user input, in this case from a touch sensor, the smartphone may un-mask the sensitive information, which may be displayed as "User Name: PIE143".

In some embodiments, in response to determining that the user selected the icon, the first mobile device may disable the screen capture function of the first mobile device, while the sensitive information is viewable (e.g., in an un-masked state) on the screen of the first mobile device. For example, when the user touches the icon, the application disables the mobile device's screen capture function, preventing the user or another application on the phone to make a record of the sensitive information by taking a picture of the user's screen while the sensitive information is displayed to the user in safe viewing mode.

Following the example above, a user may elect to view the sensitive information by touching the icon: "" on a GUI of the smartphone. Other applications on the mobile device (e.g., data mining software, malware, etc.) may try to capture the user's screen by using the smartphone's internal camera and/or screen grabber function(s) to take a picture of the sensitive information displayed on the screen. However, the other applications will be prevented from doing so, because the screen capture function(s) on the smartphone will be disabled, or turned off, while the sensitive information is being viewed by the user in a safe, screen-capture-off, mode. In some embodiments, attempts to capture the screen while the sensitive information is in a safe-viewing mode, will result in the sensitive information going back into the masked state and the screen capture providing a picture of the GUI with the masked information on the display screen.

In some embodiments, the first mobile device may send the electronic message to a second mobile device by generating a security indicator, which may include one or more rules. The security indicator's one or more rules may be the same rules that govern the first mobile device in securing the sensitive information. The first mobile device may attach the security indicator to the electronic message. The security indicator may maintain the security of the sensitive information on the second mobile device by ensuring that the second mobile device executes the rules indicated by the security indicator.

For example, a smartphone in communication with another mobile device (e.g., a smartphone, tablet, computer, etc.) may determine that sensitive information within an electronic message will be sent to the other mobile device. The smartphone is directed by an application to store the sensitive information in a secured storage area within the smartphone. The application additionally tags the electronic message as having sensitive information that is required to be secured in a secured storage area of any mobile device. Upon receipt of the sensitive information in the electronic message, the other mobile device is directed by the tag to store the sensitive information in a corresponding secured storage area and to follow the one or more rules attached to the electronic message.

In some embodiments, an electronic message determined to contain sensitive information may be sent directly from the secured storage database of the first mobile device to a second secured storage database on a second device.

In some embodiments, the present disclosure may include a memory and a processor on the first mobile device. The first mobile device (or the second mobile device) may receive an electronic message from a second mobile device (or the first mobile device). The electronic message may include sensitive information. The first mobile device may identify a security indicator attached to the electronic message. The security indicator may include one or more rules. The first mobile device may execute the one or more rules, which may include directing the first mobile device to locate a secured database. The first mobile device may store the secured sensitive information in the secured database.

For example, a user receives an instant message from their spouse asking what the bank account number is. The instant message may have been previously tagged with an indicator that suggests sensitive information is about to be sent via the instant message exchange and a secured database is accessed by the receiving device, in accordance with the rules attached via the indicator to the instant message.

In some embodiments, a second mobile device may be governed by the same one or more rules that govern the first mobile device in securing the electronic message. The first mobile device may be directed, by the one or more rules, to store the sensitive information in the secured database.

For example, a smartphone in communication with another mobile device (e.g., a smartphone, tablet, computer, etc.) may determine that sensitive information within an electronic message has been received from the other mobile device. The smartphone may have determined that sensitive information is within the electronic message, by a tag previously attached by the other mobile device. The smartphone is directed by the tag to locate a corresponding secured storage area within the smartphone to store the sensitive information. Upon securing the sensitive information in the secured database, the smartphone is directed by the tag to provide an icon to the user on the GUI of the smartphone which allows limited access to the sensitive information in a safe-viewing mode (e.g., a mode which turns off screen capture functions/features of the smartphone when the sensitive information is viewable to a user in an un-masked state).

In some embodiments, the first mobile device may be directed, by the one or more rules, to pull the sensitive information from the secured database upon request for viewing by a user. The first mobile device may be directed, by the one or more rules, to un-mask the sensitive information while it is viewable to the user. The first mobile device may be directed, by the one or more rules, to disable the screen capture function on the first mobile device while the sensitive information is viewable to the user.

For example, once a user decides to view the sensitive information in safe-viewing mode, the sensitive information is revealed, and the characters used to mask the sensitive information are replaced with the original content that was determined to be sensitive information. During the time that the sensitive information is in safe-viewing mode, neither the user nor other applications on the phone are able to use the screen capture function to create a record of the sensitive information.

In some embodiments, a second (e.g., receiving) mobile device may mask the sensitive information and may provide an icon to the user to view the sensitive information in a safe-viewing mode. The second mobile device may mask the sensitive information and provide the icon based on the same (or substantially similar) one or more rules and/or the same (or substantially similar) security tag attached to the electronic message.

In some embodiments, the first mobile device may be preprogrammed with the location of the secured database on the first mobile device and the secured database may be a cryptographically secure area (e.g., protected by encryption, SHA-1, SHA-2, etc.). For example, a smartphone may have a preprogrammed, cryptographically secured database native to its firmware that an application accesses in order to designate it as the secured storage area for sensitive information.

Figure 1B:
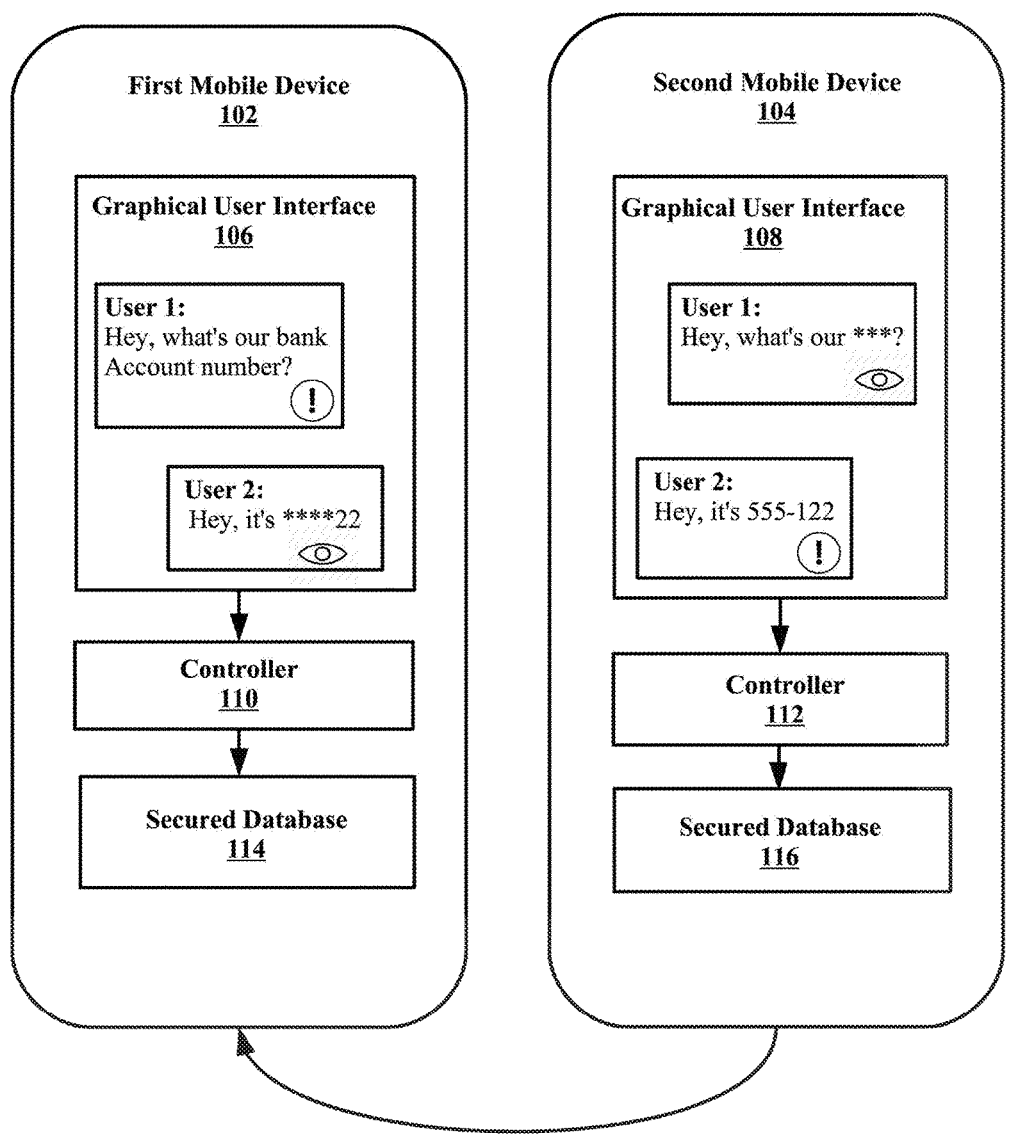
FIG. 1B depicts a second block diagram of an example system for maintaining the masking of sensitive information when shared with a second mobile device, in accordance with embodiments of the present disclosure.

Referring now to FIGS. 1A and 1B, which respectively illustrate a block diagram of a system 100 for masking user-input data, on a first mobile device 102, that is determined to be sensitive information, and the same system 100 for maintaining the masking of the sensitive information when shared with a second mobile device 104, in accordance with embodiments of the present disclosure. It is noted that like reference numerals are used to designate like parts in the accompanying drawings.

In some embodiments, the system 100 includes the first mobile device 102 and a second mobile device 104. The first mobile device 102 includes a graphical user interface (GUI) 106, a controller 110, and a secured database 114. The second mobile device 104 includes a GUI 108, a controller 112, and a secured database 116.

In some embodiments, the GUI 106 of the first mobile device 102 is in electronic connection with the controller 110. The GUI 106 provides user-input data: "Hey, what's our bank account number?" to the controller 110. The controller 110 is in electronic connection with (e.g., communicatively coupled) the secured database 114. The controller 110 determines what is sensitive information within the user-input data and provides the sensitive information to the secured database 114 for storage and safe retrieval.

In some embodiments, the first mobile device 102 is in wireless communication with the second mobile device 104. The GUI 108 of the second mobile device 104 is in electronic communication with the controller 112. The GUI 108 provides user-input data: "Hey, what's our ***?" received from the first mobile device 102, to the controller 112. The controller 112 is in electronic communication with the secured database 116. The controller 112 provides sensitive information to the secured database 116 for storage and safe retrieval. The controller 110 and the controller 112 identify the secured database on the respective mobile devices and determine whether or not to store the sensitive information there.

In some embodiments, user-input data: "Hey, what's our bank account number?" on the first mobile device 102 is viewable on the GUI 106 and the controller 110 uses one or more rules to determine that the user-input data: "Hey, what's our bank account number?" includes sensitive information: "bank account number." Upon determining that sensitive information is viewable on the GUI 106 and/or is inputted in the first mobile device 102, the controller 110 attaches a security tag, including the one or more rules, to the sensitive information: "bank account number." The controller 110 sends the sensitive information with the attached security tag to the secured database 114. The controller 110 indicates to the first mobile device 102 that it has determined that the electronic message contains sensitive information by displaying an alert icon, "☉", on the GUI 106. The icon indicates to the user that the sensitive information will be transmitted to the second mobile device 108 in a masked or partially masked state.

In some embodiments, the first mobile device 102 converts the electronic message containing the sensitive information, indicated by the controller 110 providing the alert icon, "☉" to the user on the GUI 106, to a secured state with the sensitive information masked or partially masked on the GUI 106 when the alert icon, "☉", is interacted upon/by a user.

For example, a first user sends the question: "Hey, what's our bank account number?" to a second user. The message on the first user's screen will appear as inputted, but with an icon "☉" next to the determined sensitive information, alerting the first user that the message contents will be partially or fully masked to the second user upon receipt, displaying: "Hey, what's our *?" ☞ on the GUI 108. The first user can select the alert icon "☉" to convert the message content: "Hey, what's our bank account number?" displayed on the GUI 106 of the first mobile device 102 to match how the sensitive information: "Hey, what's our *?" is displayed on the GUI 108 of the second mobile device 104. Selecting the icon: "☞" disables screen capture functions during the time the sensitive information is displayed on the GUI 106.

In some embodiments, the first mobile device 102 sends the electronic message with the sensitive information to the second mobile device 104. The controller 112 on the second mobile device 104 receives the electronic message that includes the security tag with the one or more rules. Upon determining that sensitive information is viewable on the GUI 108 and/or in the second mobile device 104, the controller 112 acknowledges that a security tag is attached to the electronic message, which includes the one or more rules for handling the sensitive information: "bank account number." The controller 112, based on the one or more rules, sends the sensitive information to the secured database 116. The secured database 116 allows the second mobile device 104 to display the sensitive information: on the GUI 108 when an icon, "👁", is interacted upon/by a user, but disables screen capture functions during the time that the sensitive information is displayed on the GUI 108.

In some embodiments, user-input data (as seen in FIG. 1B): "Hey, it's 555-122" on the second mobile device 104 is viewable on the GUI 108 and the controller 112 uses one or more rules to determine that the user-input data: "Hey, it's 555-122" includes sensitive information: "555-122". Upon determining that sensitive information is viewable on the GUI 108 and/or is inputted in the second mobile device 104, the controller 112 attaches a security tag, which includes the one or more rules for handling the sensitive information: "555-122." The controller 112 sends the sensitive information with the attached security tag to the secured database 116.

In some embodiments, the secured database 116 enables/allows the second mobile device 104 to display the sensitive information: "555-122" on the GUI 108 when an icon, "👁" (not shown), is interacted upon/by a user, but disables screen capture functions during the time the sensitive information is displayed on the GUI 106. In some embodiments, the sensitive information: "555-122" is sent to the first mobile device 102 and is displayed on the GUI 106 as "Hey, it's \*\*\*\*22" (as seen in FIG. 1B) and the sensitive information can be viewed if an icon, "👁", is interacted upon/by a user.

In some embodiments, the second mobile device 104 does not have an application downloaded or firmware supporting the present system. For example, the user-input data: "Hey, it's 555-122" on the second mobile device 104 is viewable on the GUI 108 and the controller 112 does not use the one or more rules to determine that the user-input data: "Hey, it's 555-122" includes sensitive information: "555-122" and does not provide an alert icon, "⊙". In the absence of the alert icon, the sensitive information: "555-122" is viewable on the GUI 108, but when sent to the first mobile device 102 that does have the application or firmware supporting the present system installed, the sensitive information: "555-122" will be masked on the GUI 106 of the first mobile device 102. The absence of an alert icon, "⊙", indicates to the user that sensitive information displayed on the GUI 108 is more vulnerable, in its current state, to screen capture functions or features on the second mobile device 104.

Furthering the example, a first user owning a touchscreen smartphone may need to request confidential/sensitive information from a second user by sending a text message with the sensitive information to the second user. The smartphone may determine, from one or more of the context, the syntax, and the domain-specific user-input data, that the content the first user is preparing to send through the text message is sensitive information that needs to be secured. The smartphone, following one or more rules provided by a controller within the smartphone will secure the message in a secured database for safe viewing. The secured database being an area premade by a developing entity of the smartphone and accessible dependent on the one or more rules.

Continuing the example, the first user may want to verify that the information requested is in fact the information the first user desires to receive. The first user may touch an icon on the touchscreen next to the electronic message containing the sensitive information to view the sensitive information securely. To securely view the sensitive information, the smartphone will disable its own ability to utilize screen capture functions and reveal the sensitive information to the first user, as long as the user is pressing the icon (or for a preset amount of time, e.g., 5 seconds, after pressing the icon).

Further, the first user may want to send that sensitive information to a second user and the first user directs the first mobile device to send the electronic message to the second mobile device. The controller determines that the first user wants to send the sensitive information to a second mobile device and the controller attaches a security tag and the one or more rules to the electronic message prior to sending it to the second mobile device.

Next, the second mobile device receives the electronic message and sends it directly into the secured database. The second user may want to access that sensitive information. The second user will touch the icon on the GUI next to the text content of the electronic message. The second mobile device will display the sensitive information on its GUI, following the one or more rules attached to the sensitive information. That is, the second mobile device will display the sensitive information to the second user after it has disabled the screen capture functions of the second mobile device.

Figure 2:
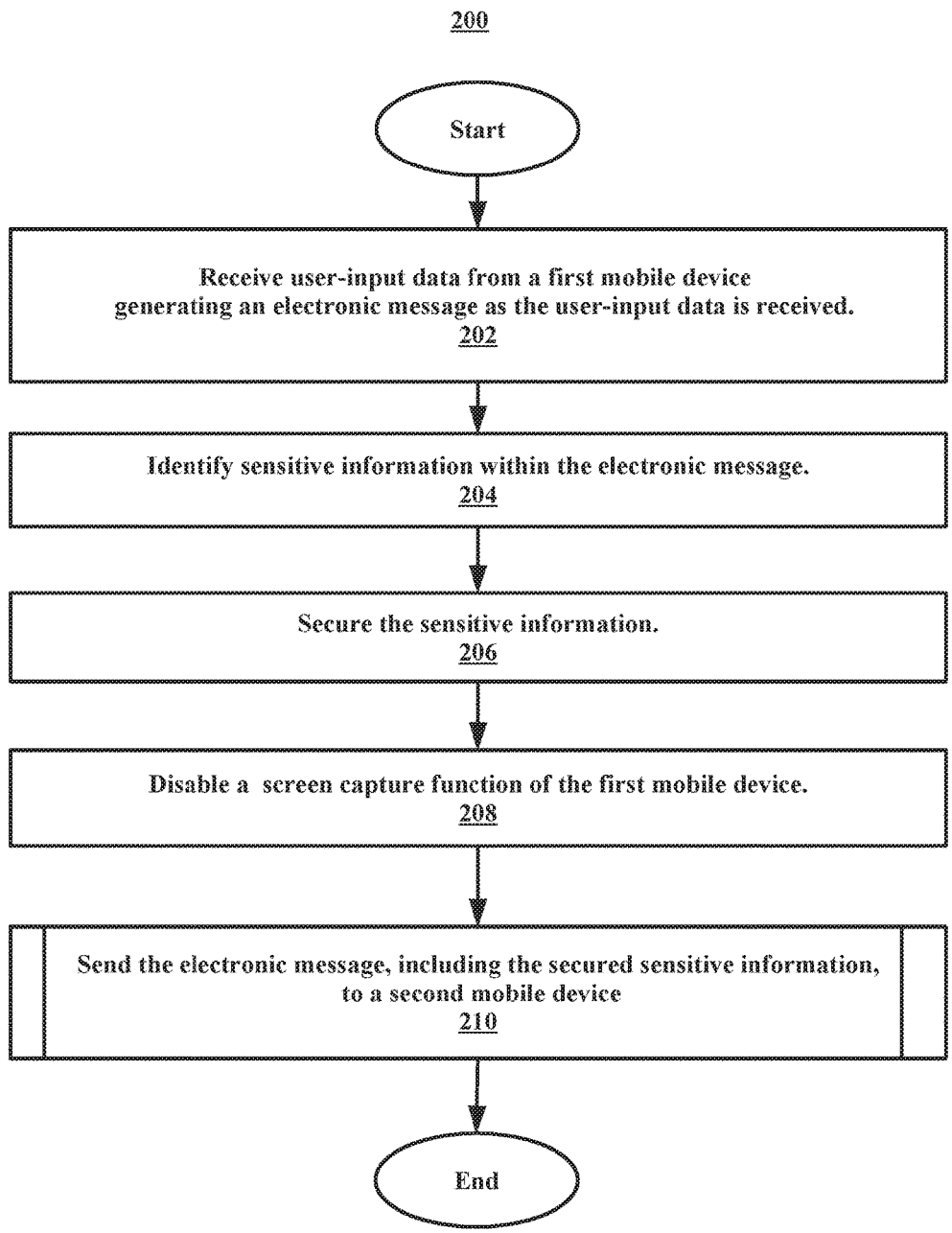
FIG. 2 illustrates a flowchart of an example method for securing sensitive information included in an electronic message on a first mobile device, in accordance with embodiments of the present disclosure.

Referring now to FIG. 2, illustrated is a flowchart of an example method 200 for sending an electronic message that includes sensitive information from a first mobile device to a second mobile device, in accordance with embodiments of the present disclosure. In some embodiments, a processor may perform the operations of the method 200. In some embodiments, the method 200 begins at operation 202. At operation 202, a first mobile device generates an electronic message upon receiving user-input data from a first user.

In some embodiments, the method 200 proceeds to operation 204, where the first mobile device identifies sensitive information within the electronic message. In some embodiments, the method 200 proceeds to operation 206. At operation 206, the first mobile device secures the sensitive information. In some embodiments, after securing the sensitive information at operation 206, the method 200 proceeds to operation 208. At operation 208, the first mobile device disables a screen capture function on the first mobile device.

In some embodiments, the method 200 proceeds to operation 210, where a first mobile device sends an electronic message including the secured sensitive information, to a second mobile device. Operation 210 is further described more fully in FIG. 3.

In some embodiments, the first mobile device and the second mobile device may be on separate computing devices (e.g., separate servers, computers, smartphones, tablets, etc.). In some embodiments, the first and second mobile devices may secure the sensitive information included in the electronic message using the same application. In some embodiments, the first mobile device may generate and secure the electronic message simultaneously. In some embodiments, the second mobile device may receive and secure the electronic message simultaneously.

For example, a first user may send sensitive information through a peer-to-peer electronic message to a co-worker. A first controller on a first mobile device and a second controller on a second mobile device may direct each mobile device to execute the same one or more rules in order to store the sensitive information in the secured database housed in/on the respective mobile devices. In some embodiments, after operation 210, the method 200 may end.

As discussed in more detail herein, it is contemplated that some or all of the operations of the method 200 may be performed in alternative orders or may not be performed at all; furthermore, multiple operations may occur at the same time or as an internal part of a larger process. For example, in some embodiments operation 210 may not be performed at all. Instead, the first user may decide not to send the electronic message, from the first mobile device, to a second mobile device.

Figure 3:
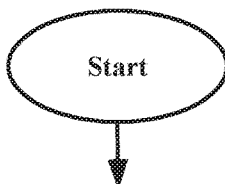
FIG. 3 illustrates a flowchart of an example method for generating a security indicator and attaching it to the electronic message when sending to a second mobile device, in accordance with embodiments of the present disclosure.

Referring now to FIG. 3, illustrated a flowchart of an example method 300 for generating a security indicator and attaching it to the electronic message when sending to a second mobile device, in accordance with embodiments of the present disclosure. In some embodiments, the method 300 is performed as part of operation 210 of FIG. 2. In some embodiments, the method 300 is illustrative of the second mobile device receiving an electronic message from the first mobile device. In some embodiments, the method 300 is illustrative of the second device sending the electronic message to another mobile device.

In some embodiments, the method 300 begins at operation 302. At operation 302, the first mobile device generates a security indicator that includes one or more rules. In some embodiments, a tag, generated by the first mobile device, includes the one or more rules that the first mobile device is bound by, in the form of a package. In some embodiments, the method 300 proceeds to operation 304. At operation 304, the first mobile device attaches the security indicator to the electronic message.

In some embodiments, the method 300 proceeds to operation 306. At operation 306, the security of the sensitive information is maintained on the second mobile device by executing the rules indicated in the security indicator. In some embodiments, upon ending the method 300, the electronic message including the sensitive information is received, and subsequently accessed/read/opened, by the second mobile device as described above in relation to operation 210 of FIG. 2. In some embodiments, after operation 306, the method 300 ends.

Figure 4:
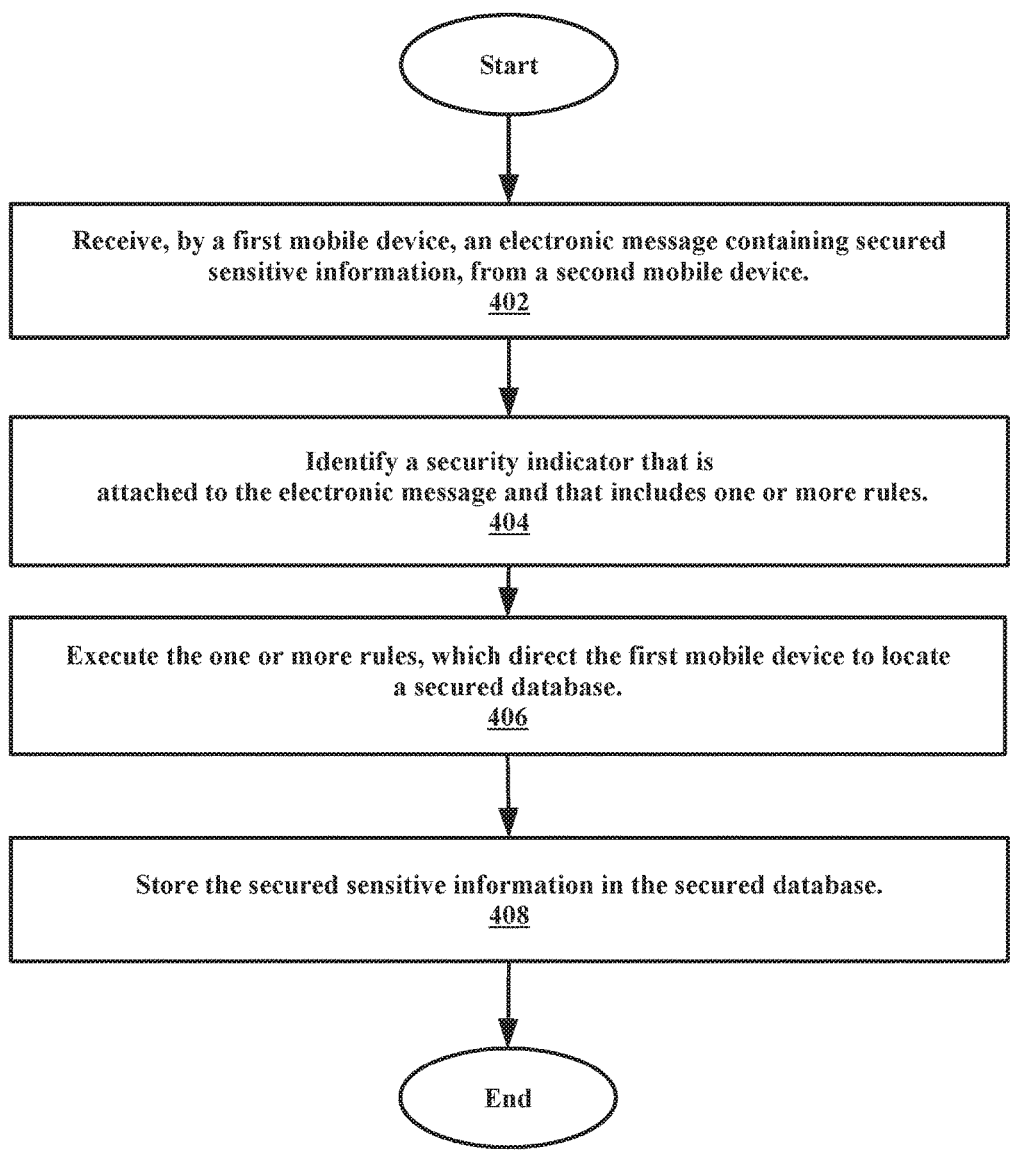
FIG. 4 illustrates a flowchart of an example method for executing rules attached to the electronic message, received by a second mobile device, including the security indicator, sent by the first mobile device, in accordance with embodiments of the present disclosure.

Referring now to FIG. 4, illustrated is a flowchart of an example method 400 for executing rules attached to an electronic message that is received by a second mobile device, including a security indicator, in accordance with embodiments of the present disclosure. In some embodiments, method 400 begins at operation 402. At operation 402, a first mobile device receives, from a second mobile device, an electronic message containing secured sensitive information.

In some embodiments, the method 400 proceeds to operation 404, where the first mobile device identifies a security indicator that is attached to the electronic message and that includes one or more rules. In some embodiments, the method 400 proceeds to operation 406, where the first mobile device executes the one or more rules that direct the first mobile device to locate a secured database in/on the first mobile device. In some embodiments, after executing the one or more rules at operation 406, the method 400 proceeds to operation 408. At operation 408, the first mobile device stores the secured sensitive information in the secured database on the first mobile device.

Figure 5:
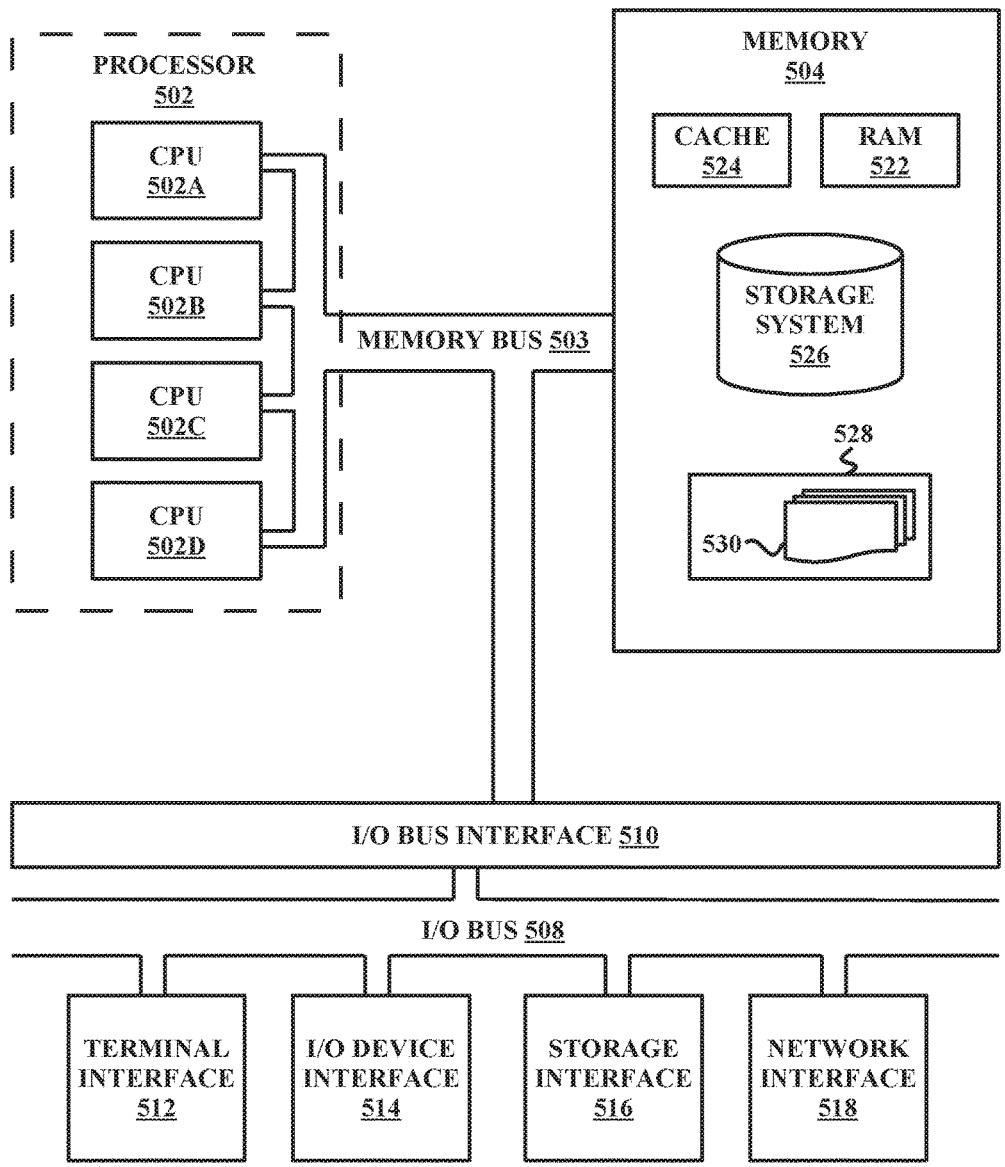
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random-access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving, by a first mobile device, user-input data for generation of an electronic message, wherein the electronic message is generated as the user-input data is received;
   identifying sensitive information within the electronic message;
   securing the sensitive information, wherein securing the sensitive information comprises:
      identifying a location of a secured database of the first mobile device, wherein the secured database is a preprogrammed, cryptographically secure area, and
      storing the sensitive information in the secured database;
   disabling a screen capture function of the first mobile device;
   masking the sensitive information, wherein masking the sensitive information includes:
      replacing one or more elements of the sensitive information on the first mobile device with one or more associated characters, and
      generating an icon that enables viewing of the sensitive information when selected by a user on a graphical user interface on the first mobile device; and
   sending the electronic message to a second mobile device, wherein the electronic message includes the secured sensitive information.

2. The method of claim 1, wherein identifying the sensitive information comprises:
   analyzing the user-input data entered on the first mobile device using semantic analysis, syntactic analysis, intent-based analysis, and domain-sensitive message content analysis; and
   associating each of the semantic, syntactic, intent-based, and domain-sensitive message contents to respective numerics; and
   determining, based on the respective numerics, that a sensitive information threshold has been exceeded.

3. The method of claim 1, further comprising:
   determining that the user is selecting the icon;
   pulling the sensitive information from the secured database; and
   displaying the sensitive information to the user.

4. The method of claim 3, further comprising:
   disabling, in response to determining that the user selected the icon, the screen capture function while the sensitive information is viewable on the first mobile device.

5. The method of claim 1, wherein sending the electronic message to the second mobile device comprises:
   generating a security indicator, wherein the security indicator includes one or more rules, wherein the one or more rules are the same rules that govern the first mobile device in securing the sensitive information;
   attaching, the security indicator to the electronic message; and
   maintaining the security of the sensitive information on the second mobile device by the second mobile device executing the rules indicated by the security indicator.

6. A computer program product comprising a computer readable storage medium having program instructions embodied therewith, the program instructions executable by a processor to cause the processor to perform a method, the method comprising:
   receiving, by a first mobile device, user-input data for generation of an electronic message, wherein the electronic message is generated as the user-input data is received;
   identifying sensitive information within the electronic message;
   securing the sensitive information, wherein securing the sensitive information comprises:
      identifying a location of a secured database of the first mobile device, wherein the secured database is a preprogrammed, cryptographically secure area, and
      storing the sensitive information in the secured database;
   disabling a screen capture function of the first mobile device;
   masking the sensitive information, wherein masking the sensitive information includes:
      replacing one or more elements of the sensitive information on the first mobile device with one or more associated characters, and
      generating an icon that enables viewing of the sensitive information when selected by a user on a graphical user interface on the first mobile device; and
   sending the electronic message to a second mobile device, wherein the electronic message includes the secured sensitive information.

7. The computer program product of claim 6, wherein identifying the sensitive information comprises:
   analyzing the user-input data entered on the first mobile device using semantic analysis, syntactic analysis, intent-based analysis, and domain-sensitive message content analysis; and
   associating each of the semantic, syntactic, intent-based, and domain-sensitive message contents to respective numerics; and
   determining, based on the respective numerics, that a sensitive information threshold has been exceeded.

8. The computer program product of claim 6, further comprising:
    determining that the user is selecting the icon;
    pulling the sensitive information from the secured database; and
    displaying the sensitive information to the user.

9. The computer program product of claim 8, further comprising:
    disabling, in response to determining that the user selected the icon, the screen capture function while the sensitive information is viewable on the first mobile device.

10. The computer program product of claim 6, wherein sending the electronic message to the second mobile device comprises:
    generating a security indicator, wherein the security indicator includes one or more rules, wherein the one or more rules are the same rules that govern the first mobile device in securing the electronic message;
    attaching, the security indicator to the electronic message; and
    maintaining the security of the electronic message on the second mobile device by the second mobile device executing the rules indicated by the security indicator.

11. A system comprising:
    a memory; and
    a processor in communication with the memory, the processor being configured to perform operations comprising:
    receiving, by a first mobile device, user-input data for generation of an electronic message, wherein the electronic message is generated as the user-input data is received;
    identifying sensitive information within the electronic message;
    securing the sensitive information, wherein securing the sensitive information comprises:
        identifying a location of a secured database of the first mobile device, wherein the secured database is a preprogrammed, cryptographically secure area, and
        storing the sensitive information in the secured database;
    disabling a screen capture function of the first mobile device;
    masking the sensitive information, wherein masking the sensitive information includes:
        replacing one or more elements of the sensitive information on the first mobile device with one or more associated characters, and
        generating an icon that enables viewing of the sensitive information when selected by a user on a graphical user interface on the first mobile device; and
    sending the electronic message to a second mobile device, wherein the electronic message includes the secured sensitive information.

12. The system of claim 11, wherein identifying the sensitive information comprises:
    analyzing the user-input data entered on the first mobile device using semantic analysis, syntactic analysis, intent-based analysis, and domain-sensitive message content analysis; and
    associating each of the semantic, syntactic, intent-based, and domain-sensitive message contents to respective numerics; and
    determining, based on the respective numerics, that a sensitive information threshold has been exceeded.

13. The system of claim 11, further comprising:
    determining that the user is selecting the icon;
    pulling the sensitive information from the secured database; and
    displaying the sensitive information to the user.

14. The system of claim 13, further comprising:
    disabling, in response to determining that the user selected the icon, the screen capture function while the sensitive information is viewable on the first mobile device.

15. The system of claim 11, wherein sending the electronic message to the second mobile device comprises:
    generating a security indicator, wherein the security indicator includes one or more rules, wherein the one or more rules are the same rules that govern the first mobile device in securing the sensitive information;
    attaching, the security indicator to the electronic message; and
    maintaining the security of the sensitive information on the second mobile device by the second mobile device executing the rules indicated by the security indicator.

* * * * *